United States Patent [19]
Miller et al.

[11] 3,941,949
[45] Mar. 2, 1976

[54] METHOD AND APPARATUS FOR ISOLATING MALFUNCTIONS OCCURRING IN SENDER-RECEIVER COMMUNICATION SWITCHING SYSTEM EQUIPMENT

[75] Inventors: Howard R. Miller, College Station, Tex.; Leo J. Putchinski, Jr., Wheeling; Kenneth W. Vanderlei, Wheaton, both of Ill.

[73] Assignee: GTE Automatic Electric Laboratories Incorporated, Northlake, Ill.

[22] Filed: Feb. 27, 1974

[21] Appl. No.: 446,576

[52] U.S. Cl. .......................................... 179/175.2 R
[51] Int. Cl.² .......................................... H04M 3/24
[58] Field of Search ................ 179/175.2 R, 175.23; 340/172.5

[56] References Cited
UNITED STATES PATENTS

| | | | |
|---|---|---|---|
| 3,299,220 | 1/1967 | Wedmore | 179/175.2 R |
| 3,446,921 | 5/1969 | Denend | 179/175.23 |
| 3,626,383 | 12/1971 | Oswald | 179/175.2 R |

*Primary Examiner*—Douglas W. Olms

[57] ABSTRACT

A method and apparatus for isolating malfunctions occurring in a communication switching system having a line switching network for establishing communications selectively between calling and called lines under the control of common equipment including a plurality of registers for storing temporarily call processing information received from the calling lines via a plurality of register junctors, a junctor switching network connecting selectively a pool of sending units and receiving units to the junctors, the common equipment including memory, includes establishing a connection between a register junctor and a sender-receiver unit for test purposes, connecting testing circuits to the register junctor via the line switching network, testing the register junctor circuits to determine whether or not they can extend a path from the line switching network to the junctor switching network, testing the sender-receiver unit by means of the testing circuits via the path between the junctor and the sender-receiver unit if the junctor circuit was found to operate properly, and thereafter establishing a new path between a selected different one of the register junctors and the same sender-receiver unit under test so that the new path can be checked for continuity if the sender-receiver unit under test was found to operate properly, whereby a malfunction can be isolated to either a register junctor, sender-receiver unit or the junctor network interconnecting them.

6 Claims, 10 Drawing Figures

METHOD AND APPARATUS FOR ISOLATING MALFUNCTIONS OCCURRING IN SENDER-RECEIVER COMMUNICATION SWITCHING SYSTEM EQUIPMENT

BACKGROUND OF THE INVENTION

1. Field of the Invention

This invention relates to a method and apparatus for isolating malfunctions occurring in sender-receiver equipment.

2. Description of the Prior Art

Electronic communication switching systems, such as electronic telephone switching systems, have employed registers for receiving and temporarily storing call processing information from calling lines. Register junctors have been employed for conveying the call processing information to the appropriate registers. The register junctors have been provided with senders and receivers, such as touch calling multi-frequency (TCMF) and multi-frequency (MF) receivers and multi-frequency (MF) senders, and the senders and receivers have been selectively interconnected with the register junctors for use thereby. Should a malfunction occur during the operation of the system, a call would then have to be reinitiated. Eventually, the service would be degraded in that the initiation of calls would continuously be repeated. Therefore, it would be highly desirable to have a method and apparatus for quickly and efficiently isolating the source of the malfunction so that repair or replacement could take place to alleviate the problem. In this regard, it would be desirable to quickly and efficiently be able to determine whether the problem is caused by the register junctor, the sender-receiver unit or by the switching network interconnecting them.

SUMMARY OF THE INVENTION

Therefore, the principal object of the present invention is to provide a new and improved method and apparatus for isolating the cause of malfunctions occurring in sender-receiver equipment.

CROSS-REFERENCES TO RELATED APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. patent application Ser. No. 130,133 filed Apr. 1, 1971 by K. E. Prescher, R. E. Schauer and F. B. Sikorski, and a continuation-in-part thereof Ser. No. 342,323 filed Mar. 19, 1973, now patent No. 3,835,260 issued Sept. 10, 1974, hereinafter referred to as the SYSTEM application. The system may also be referred to as No. 1 EAX or simply EAX.

The memory access, and the priority and interrupt circuits for the register-sender subsystem are covered by U.S. Pat. application Ser. No. 139,480 filed May 3, 1971 now U.S. Pat. No. 3,729,715 issued Apr. 24, 1973, by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. Pat. application Ser. No. 201,851 filed Nov. 24, 1971 now U.S. Pat. No. 3,737,873 issued June 5, 1973, by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909, now U.S. Pat. No. 3,784,801, issued Jan. 8, 1974, by J. P. Caputo and F. A. Weber for a DATA HANDLING SYSTEM ERROR AND FAULT DETECTING AND DISCRIMINATING MAINTENANCE ARRANGEMENT, Ser. No. 270,910, now U.S. Pat. No. 3,783,255 issued Jan. 1, 1974, by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912, now U.S. Pat. No. 3,783,256 issued Jan. 1, 1974, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 381,586 filed Aug. 17, 1972 now U.S. Pat. No. 3,806,659 issued Apr. 23, 1974, by J. W. Eddy for an INTERLOCK ARRANGEMENT FOR A COMMUNICATION SWITCHING SYSTEM, Ser. No. 311,606 filed Dec. 4, 1972 now U.S. Pat. No. 3,830,983 issued Aug. 20, 1974 by J. W. Eddy and S. E. Puccini for a COMMUNICATION SYSTEM CONTROL TRANSFER ARRANGEMENT, Ser. No. 303,157 filed Nov. 2, 1972 now U.S. Pat. No. 3,809,822 issued May 7, 1974 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 now U.S. Pat. No. 3,814,859 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. patent application Ser. No. 347,281, filed Apr. 2, 1973 by C. A. Kalat, E. F. Wodka, A. W. Clay and P. R. Harrington for a STORED PROGRAM CONTROL IN A COMMUNICATION SWITCHING SYSTEM, hereinafter referred to as the EXECUTIVE PROGRAM patent application.

The computer third party circuit is disclosed in U.S. patent application Ser. No. 348,575, filed Apr. 6, 1973 for a "DATA PROCESSOR SYSTEM DIAGNOSTIC ARRANGEMENT" by L. V. Jones et al, hereinafter referred to as the THIRD PARTY patent application.

The automatic test system for the system is disclosed in the following United States patent applications:

H. R. Miller, L. J. Putchinski, K. W. Vanderlei and D. A. Heck application Ser. No. 446,433, filed Feb. 27, 1974; T. W. Crosley, H. R. Miller and L. J. Putchinski application Ser. No. 446,574, filed Feb. 27, 1974; H. R. Miller and L. J. Putchinski application Ser. No. 446,548, filed Feb. 27, 1974; L. J. Putchinski, and H. R. Miller and T. W. Crosley application Ser. No. 446,575, filed Feb. 27, 1974.

The above system, register-sender, marker communication register, executive program, third party, computer localization program and automatic test system patents and applications are incorporated herein and made a part hereof as though fully set forth.

BRIEF DESCRIPTION OF THE DRAWINGS

This invention will become more apparent and be better understood by reference to the following description of an embodiment of the invention taken in conjunction with the accompanying drawings in which.

DESCRIPTION OF THE PREFERRED EMBODIMENT

Figure 1:
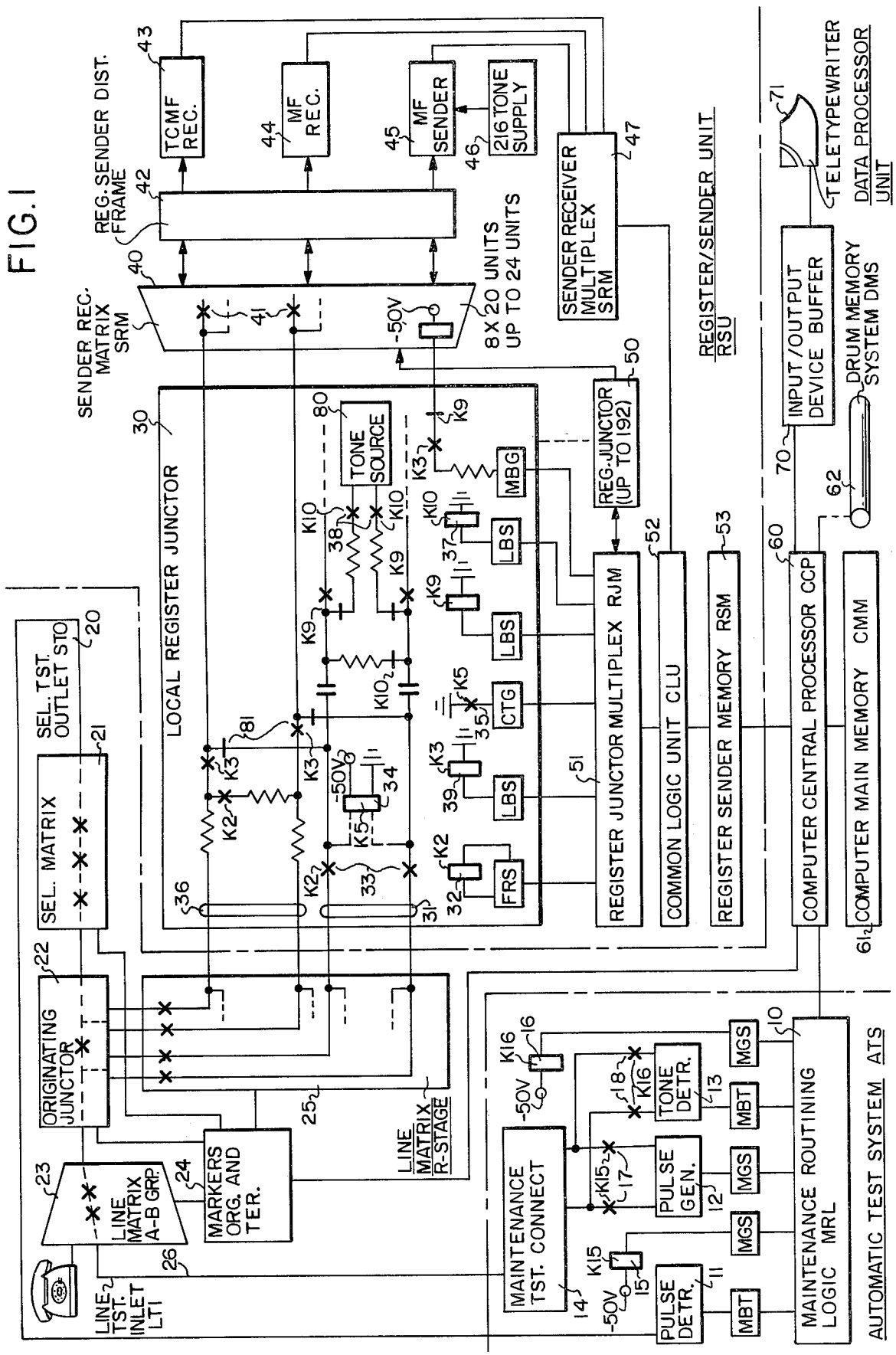
FIG. 1 is a simplified block diagram of the system incorporating the principles of the present invention.

The communication switching system employing the method and apparatus of the present invention is disclosed in the foregoing mentioned patent and patent applications incorporated herein and made a part hereof by reference, and the method and apparatus of the present invention may be employed with the system, it being understood that the method and apparatus of the present invention may also be employed in other systems as well. Referring now to FIG. 1 of the drawings, the system disclosed in the cited patents and patent applications includes an automatic test system ATS having generators, such as pulse generator 12, and detectors, such as pulse detector 11 and tone detector 13, necessary for routine testing of the register-sender space divided apparatus, namely register junctors 30 and 50, touch calling multiple frequency (TCMF) receiver 44, multiple frequency (MF) receiver 43, and multiple frequency (MF) sender 45 of a register sender unit RSU. While only one of each kind of sender and receiver is shown in the drawings, it is to be understood that there are a pool of such senders and receivers, which are connected selectively to the register junctors by a sender-receiver junctor matrix 40 via a register sender distributor frame 42.

The register sender unit RSU includes space divided apparatus which are functionally tested by an automatic test system ATS which in turn is controlled by the computer central processor CCP of the communication switching system. The switching system in the preferred form of the present invention is an electronic telephone switching system.

The system ATS obtains access to the RSU space divided apparatus, such as the register junctors, touch calling multiple frequency receivers, multiple frequency receivers MFR and multiple frequency senders MFS through special test circuits, such as the line test inlet circuit LTI on switching system line matrix 23 and a selector test outlet STO circuit of the switching system selector matrix. The system ATS sends and receives digits and tones to test for proper functioning of register junctors, senders and receivers. The digits or tones are interpreted as part of the normal operation of the register sender unit RSU. The controlling software operates from the computer control processor CCP to control the operation of the system ATS and the unit RSU in a sequential manner to verify the operation of the apparatus under test as hereinafter described in greater detail.

The system ATS includes an electronic logic MRL circuit 10 which sequences the operation of the pulse generator 12 and operates a K15 relay 15 to operate K15 relay contacts 17 to connect the generator 12 to maintenance test connect circuit 14, which in turn extends a test path therethrough to the line matrix AB group 23 at the line test inlet LTI 26 terminal. Similarly, a relay 16 is controlled by the MRL unit 10 to connect a tone generator circuit 13 via contacts 18 of the relay 16 to the same test path. Thus, the generator 12 and the detectors 11 and 13 are testing circuits, which are selectively connected through the call processing line switching network including the matrix 23, originating junctor 22 and the matrix 25 to the register junctors for testing them as well as the matrix 40 and the senders and receivers in accordance with the present invention as hereinafter described in greater detail. The generator 12 and detectors 11 and 13 communicate with the unit 10 via interface circuits in a manner as more fully described in the above-cited applications and in a similar manner as the interface circuits in the register junctors, such as the junctor 30 for communicating between the register junctors and a register junctor multiplex 51.

Under control of an originating marker 24, the test path is extended through an originating junctor 22 and from there through a line matrix R stage 25 to a pair or originating leads 31 of the local register junctors, such as the junctor 30. The originating marker 24 also causes a K2 hold relay 32 by means (not shown) to operate by means of the register junctor multiplex RJM 51 causing the K2 relay contacts 33 to close. Under software control by programs stored partially in the computer main memory CMM 61 and in the DMS drum memory system 62 and operated from the computer central processor CCP 60, instructions are given to the circuit MRL 10 to operate the pulse generator circuit 12. As the pulse generator operates the K5 relay 34 operates following the pulses causing K5 relay contacts 35 to follow the pulses in synchronism to relay them to the register sender. The pulse digits are counted as a normal function of the common logic unit 52 via register junctor multiplex RJM 51 and are stored in register sender memory RSM 53. The stored digits are caused to be read from the memory RSM 53 by the software program operating in the processor CCP 60. There, for test purposes, the dial pulses are compared to the expected values as stored in the CMM memory 61, thus verifying the ability of the local register junctor to sense dial pulses. The unit RSU has the ability to process information from up to 192 register junctors which may be either local register junctors or incoming register junctors. The local register junctor 30 is shown in some detail to serve as a representative example, and the remaining register junctors are indicated by the box 50 and may also be tested in a similar manner.

With the same network path still connected for the generator 12, the register junctor may also be tested for its ability to return dial tone by instructing the MRL unit 10 to release the K15 relay 15 and operate the K16 relay 16 to close its K16 relay contacts 18 via software control. The software program also instructs the unit RSU via its RSM unit 53 and the CLU unit 52 to operate the K10 relay of junctor 30 to connect a tone source 80 via K10 relay contacts 38 to the test path. Thus, the local register junctor 30 is tested for its ability to return dial tone when the detector 13 receives the tone properly.

In a similar manner and with the same test path but with the K10 relay 37 not operated, the local register junctor under test may also be tested for its ability to receive touch calling multiple frequency TCMF digits. To perform this test the software program operating from the CCP processor 60 instructs the MRL unit 10 to operate K15 relay 15 of the ATS system to connect the pulse generator 12 to the previously set up network test path via K15 relay contacts 17. Also under software program control, the unit RSU is instructed via memory RSM 53 and unit CLU 52 to connect one of a plurality of TCMF receivers, such as the receiver 43, by operating the sender receiver multiplex circuit SRM 47. The TCMF receiver is connected to the register junctor under test through the register sender distributing frame 42 via the sender receiver matrix SRM 40, which is operated by junctor 30 to close one pair of a group of matrix crosspoints, only one pair of which is shown at 41. Thus, the local register junctor under test is tested for its ability to receive TCMF digits as required. Other register junctors, usually incoming register junctors, are tested in a manner similar to that described for the TCMF receiver, local register junctor case to receive multiple frequency digits using one of a plurality of MF receivers 44.

Both incoming register junctors or local register junctors, as shown at 30, may be tested for their ability to send MF tones. For this test the MAL circuit 10 is instructed under software control to operate the pulse detector circuit 11. The terminating marker of the originating and terminating markers 24 is further instructed to complete a network path through selector matrix 21 from the selector test outlet circuit 20 of the system ATS to the originally selected originating junctor 22 connecting a pair of terminating leads 36 of the local register junctor 30. The unit RSU is then instructed via RSM unit 53 and CLU unit 52 to connect sender 45 of the plurality of MF senders which are all connected to a two out of six (2/6) tone supply circuit 46. The selected MF sender is controlled through the matrix SRM 47 and is connected through the register sender distributing frame 42 and the sender receiver matrix SRM 40 via matrix crosspoints 41 to junctor 30 under its control. Under unit CLU control, a K3 relay 39 is energized in the local register junctor 30 to operate K3 relay transfer contacts 81 connecting the MF sender to the selector matrix test path and the STO outlet 20 to the pulse detector. Multifrequency digits are then sent and detected via the pulse detector circuit 11 in the system ATS and are finally compared with the expected values by software procedures operating in the CCP processor 60.

Test results of all system ATS tests including register junctor tests are printed out on the teletypewriter 71 via input/output device buffer 70 by the controlling software program operating in the CCP processor 60. The teletypewriter is also used to make requests to the system ATS for selected space divided apparatus tests.

The TCMF receivers, MF receivers and MF senders are used during the processing of the switching system call processing operations by being used only during digit reception and transmission, and they are used only as long as necessary and are returned to their idle state to be made available for use in other call processes. Hence, relatively few senders and receivers are accessible to the many register junctors through the medium of the matrix SRM 40. In the preferred form of the present invention, the matrix SRM includes planes which are used for groups of eight register junctors at a time, and each plane comprises an 8 by 20 crosspoint configuration allowing eight register junctors to achieve access to twenty senders and receivers through the medium of the register sender distributing frame 42. As a group of eight register junctors are added, an additional plane is also added. Thus, the total number of senders or receivers accessible by a group of 8 register junctors depends on the amount of traffic to be handled by the switching system. Hence, not all twenty sender-receiver terminals on the matrix SRM are required to be used. The distributing frame 42 further allows a given sender or receiver to be accessed by more than one group of eight register junctors.

TESTING PROCEDURE

Since the matrix SRM is not duplicated and no inherent matrix fault localization circuits need to or are provided in the preferred form of the present invention, faults can occur in the matrix SRM which can degrade office call handling capabilities. The only means for verifying the proper operation of the matrix SRM is to test combinations of register junctors and senders and receivers and verify that they operate properly. This capability is provided by the system ATS in accordance with the present invention.

The system ATS receives requests for testing the operation of register junctors and sender or receiver combinations from either a register sender space divided apparatus diagnostics software program or from a switching system office craftsman via a teletypewriter.

Register sender space divided apparatus diagnostic software gains control whenever call processing software encounters problems while utilizing a register junctor in processing a call and proceeds to isolate the cause of the problems. A problem, for example, could be that a specified sender or receiver could not be connected to a specified register junctor, indicating a possible failing crosspoint in the matrix SRM. Another example of a problem might be that the register junctor encountered a malfunction while a sender or receiver was being attached, also indicating a possible failing crosspoint. In both of these situations the system ATS is requested to test the register junctor and sender or receiver combination for proper operation. Thus, the suspected crosspoints in the matrix SRM are accessed and verified for proper operation as hereinafter described in greater detail.

The switching system office craftsman also utilizes the system ATS to test the matrix SRM operation when attempting to localize a suspected register junctor-sender/receiver problem or to test that the replacement of a matrix SRM plane connected to a register junctor-sender/receiver problem. The system ATS is also used whenever additional senders and receivers and associated matrix planes are added due to increased traffic handling requirements. This enables the switching system office craftsman to fully test the operational aspects of the new apparatus before it is used in the processing of telephone calls.

The system ATS hardware in combination with the associated system ATS software tests register junctors and sender or receiver combinations for proper connection and disconnection as well as for proper digit sending or digit reception. This process insures that the path through the matrix SRM is continuous and has sufficient signal transmission quality for use in processing calls.

In accordance with the present invention, when a particular register junctor, such as the junctor 30 connected by crosspoints, such as crosspoints 41, to a particular sender/receiver unit, such as the receiver 43, fails to function properly so that the call must be reinitiated and other equipment employed, the ATS system under software control causes the establishment of the same suspect path between the junctor 30 and the receiver 43 via the crosspoints 41 for the purpose of isolating the cause of the malfunction — the junctor 30, the matrix 40 or the receiver 43, so that the faulty equipment can be repaired or replaced. After the path is established, the junctor 30 is tested for proper operation by performing various tests as described herein as well as other tests as more fully described in the above-cited patents. For example, the K3 relay 39 is operated remotely by the ATS system to determine whether its transfer contacts 81 are able to function properly to connect the receiver 43 to the leads 36 and to the leads 31 so that it can be determined whether the receiver 43 can be coupled through the register junctor 30. If not, then the junctor 30 is determined to be the faulty unit.

If the junctor 30 passes all of its tests, then the receiver 43 is tested to determine whether or not it can function properly. In this regard, for example, TCMF signals are transferred from the ATS system to the receiver 43 to determine whether or not the signals have been properly received. For this purpose, marginally acceptable signals within a range of acceptable values are sent to the receiver 43 so that these parameters may be range checked. Marginally acceptable tones are sent to the receiver 43 with tones which are either high, low or nominal in frequency and amplitude as more fully described in the above-cited automatic test system patent applications such as application Ser. No. 446,548, filed Feb. 27, 1974 now Pat. No. 3,886,323 issued May 27, 1975. If the receiver 43 does not pass these checks, then it must be determined if the receiver 43 is faulty or if the crosspoint contacts 41 prevented the marginal signals from being properly received by the receiver 43. If the receiver 43 is determined to operate satisfactorily, then the suspect devices are no longer suspected and are determined to be operative.

If the marginal parameter tests on the receiver 43 have failed, then in order to determine whether the receiver 43 or the matrix 40 is at fault, another connection is established between a randomly selected register junctor of the junctors 50 through other crosspoints (not shown) to the suspected receiver 43. The marginal parameter tests are then repeated using the new connection. If the tests are successful, then the contacts 41 are condemned so that the matrix 40 or the relevant portions thereof may be repaired or replaced. If the tests are not successful in all respects, then the receiver 43 is condemned and is either replaced or repaired.

After one of the three units is replaced or repaired, the repaired or replaced unit is tested again according to a repair verify test operation more fully described in the above-cited patent application Ser. No. (EN-1739), filed Feb., 1974.

SOFTWARE PROCEDURES

Figure 2:
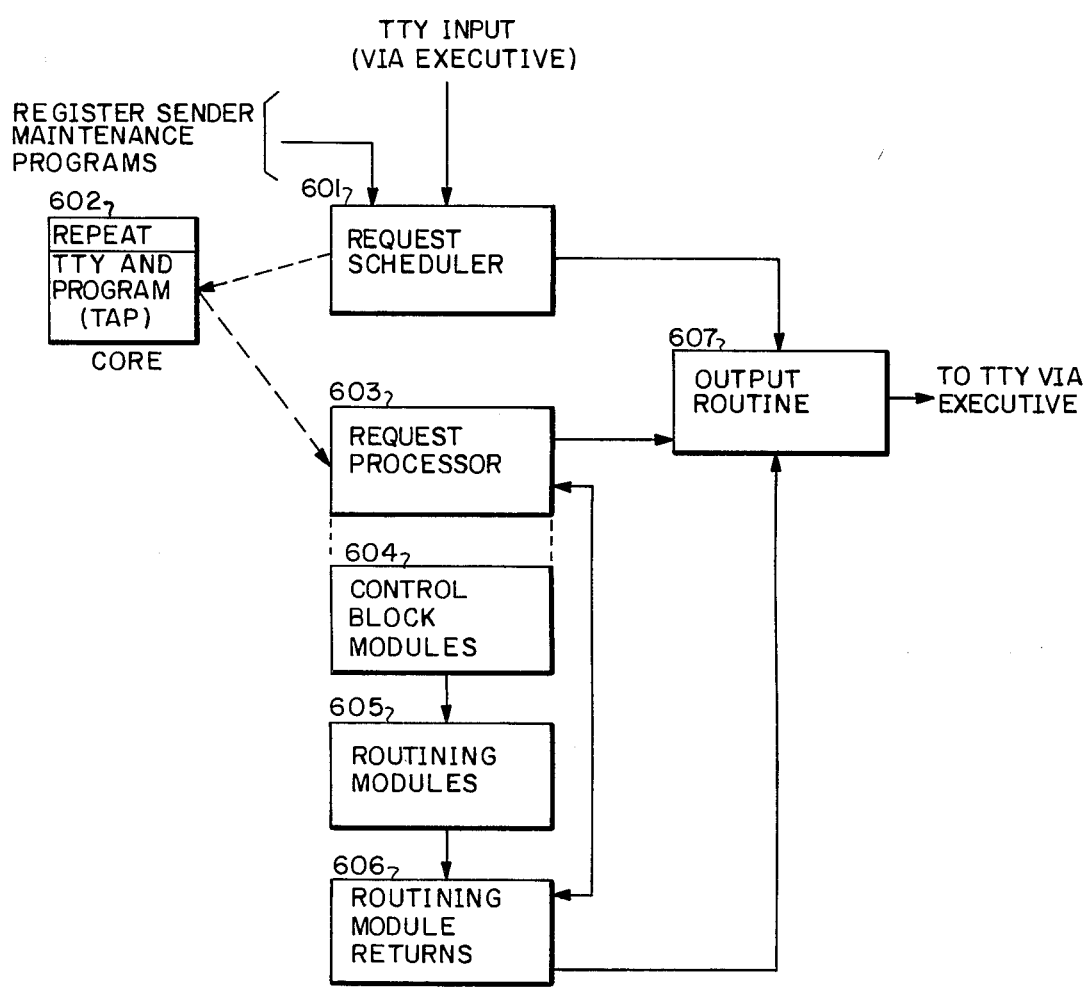
FIG. 2 is a block flow chart diagram of the automatic test system software program arrangement for the system of FIG. 1.

The method and apparatus of the present invention is carried out by the system ATS hardware under control of the system ATS software. The overall arrangement and flow of the system ATS software is shown in FIG. 2. System ATS requests enter into the Request Scheduler module 601 from the office teletypewriter or as a client request from the register sender space divided apparatus maintenance programs. The request scheduler verifies that the request is acceptable and adds the request to the teletypewriter and program request TAP quenue 602. For all except client requests, the request scheduler 601 also outputs a message indicating message acceptance via the output routine 607. The request processor module is then given control and upon finding the request in the queue TAP sets up data in working storage of the computer main memory for one of a plurality of control block modules 604. The control block module then causes a message to be output indicating the start of execution of the test, verifies the unit identity of the particular unit to be tested and passes control to a routining module 605. The routining module performs the actual routine interfacing with the system hardware including markers for path setup, register sender, and the system ATS hardware. Upon completion of a single test request, the routining module 605 releases control to the routining module returns module 606 indicating all tests passed ATP, failure or other indications such as path blockage. The routining module returns module 606 then scores the pass, failure, or blockage indication and outputs an all tests pass ATP message for a pass, a trouble report TR message for a fail, or other message as required. Module 606 then returns control to the request processor 603 which subsequently yields control to the appropriate control block module 604. If all tests on the apparatus unit have not been completed, then the cycle repeats until all tests are complete. When all tests on the unit are complete, a message is output via the output routing 607 to indicate the end of testing on that unit.

SOFTWARE OPERATION EXAMPLE

As an example, assume that a single request has been made to test the operation of a specified local register junctor in combination with a specified TCMF receiver. Other combinations are possible such as local register junctor with an MF sender, incoming register junctor with an MF receiver or an incoming register junctor with an MF sender. These optical cases are similar in operation to the local register junctor and TCMF receiver testing.

Figure 3:
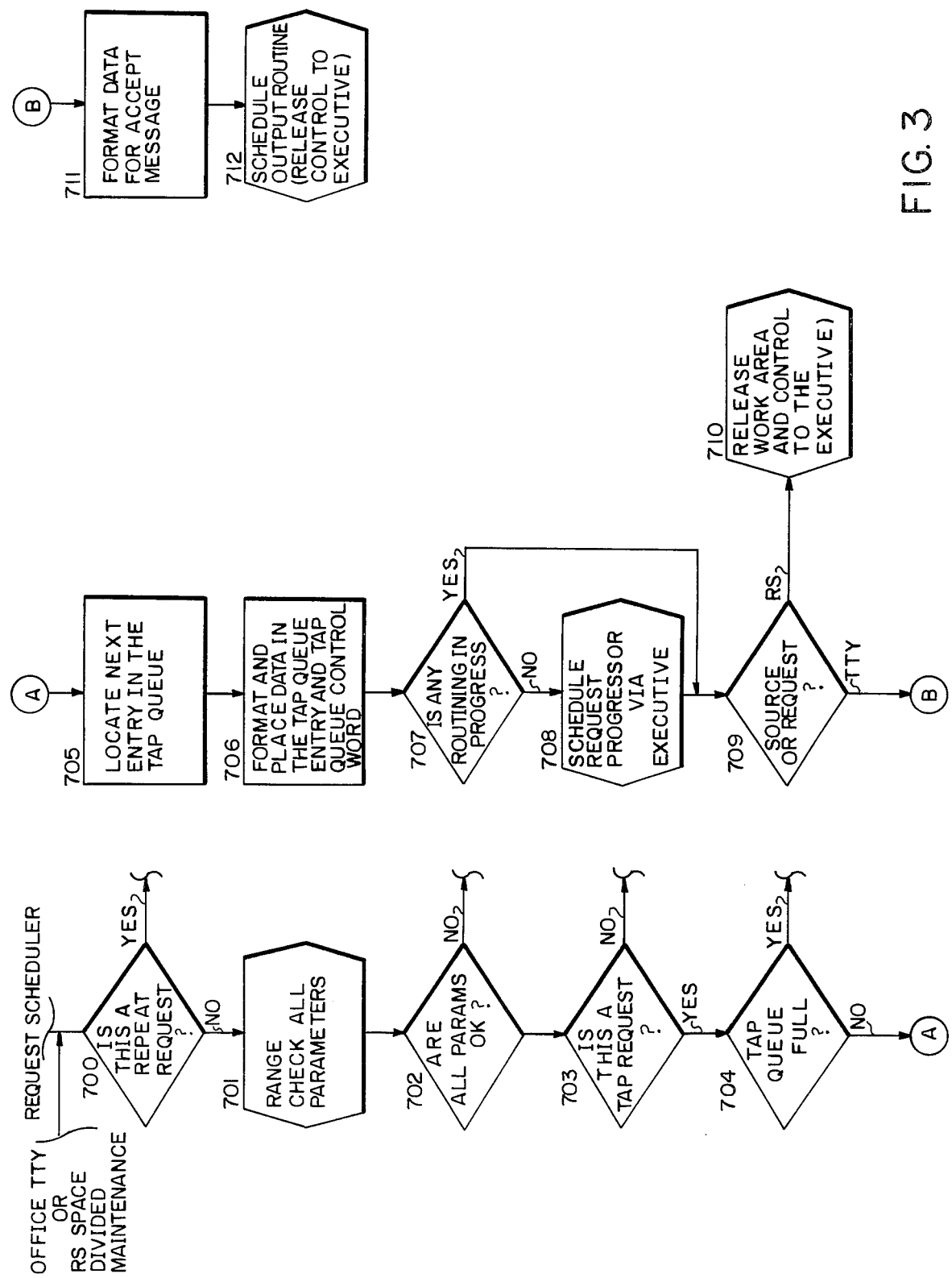
FIGS. 3–10 are flow chart diagrams for the automatic test system software arrangement to control the operation of the system of FIG. 1 according to the present invention.

Referring to FIG. 3, the system ATS receives the input request from a teletypewriter or from register sender space divided apparatus diagnostics 700. The first check which is made to determine if the request is for a repeat or a non-repeat test. Next the parameters are checked for the proper range in blocks 701 and 702. After having been found in range, the request is added to the queue TAP in blocks 703–706. The request processor module is then scheduled if it is not already active, blocks 707 and 708. Next, control is passed to the system executive program to release control or to output a message on the typewriter 71 (FIG. 1) indicating acceptance of the request and then release control, blocks 709–712.

Figure 4:
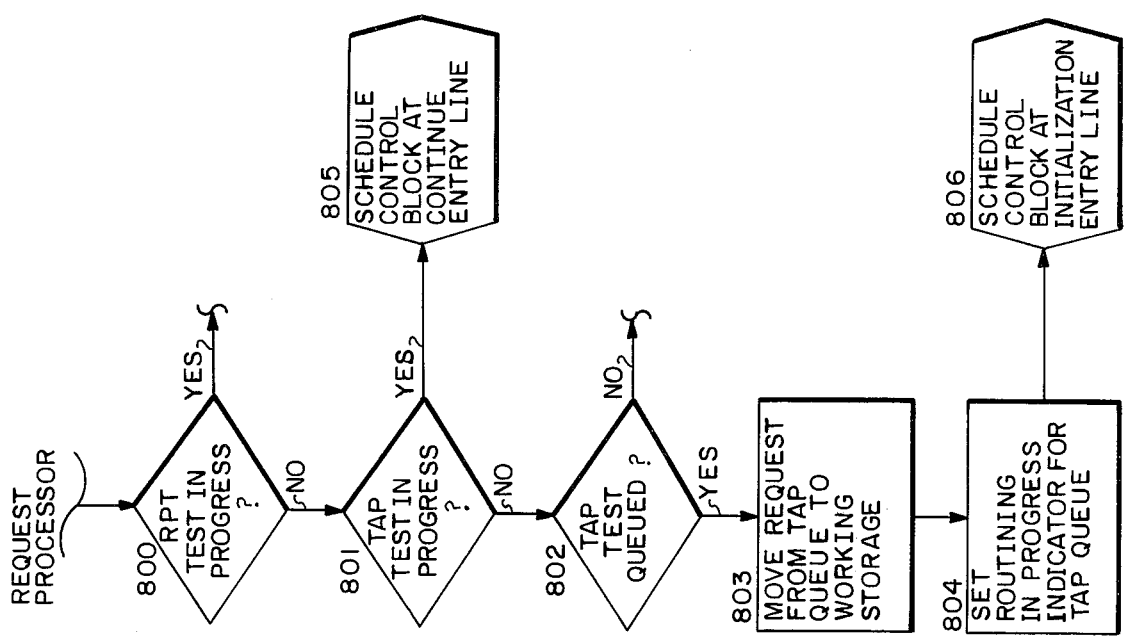

Referring now to FIG. 4, the request processor module is given control either because it was scheduled by the request scheduler module 708 or because it is already actively processing a request. After determining that neither repeat queue nor queue TAP processing is in progress as shown in blocks 800 and 801, a search is made to determine if any requests are now queued, block 802. The request processor then moves a request found in the queue working storage and sets the proper routining in progress indicator as shown in blocks 803 and 804. One of a plurality of routining control drum blocks is then given control at its initialization entry line to begin processing the request. In the present example, the register junctor drum block module 806 is given control.

Figure 5:
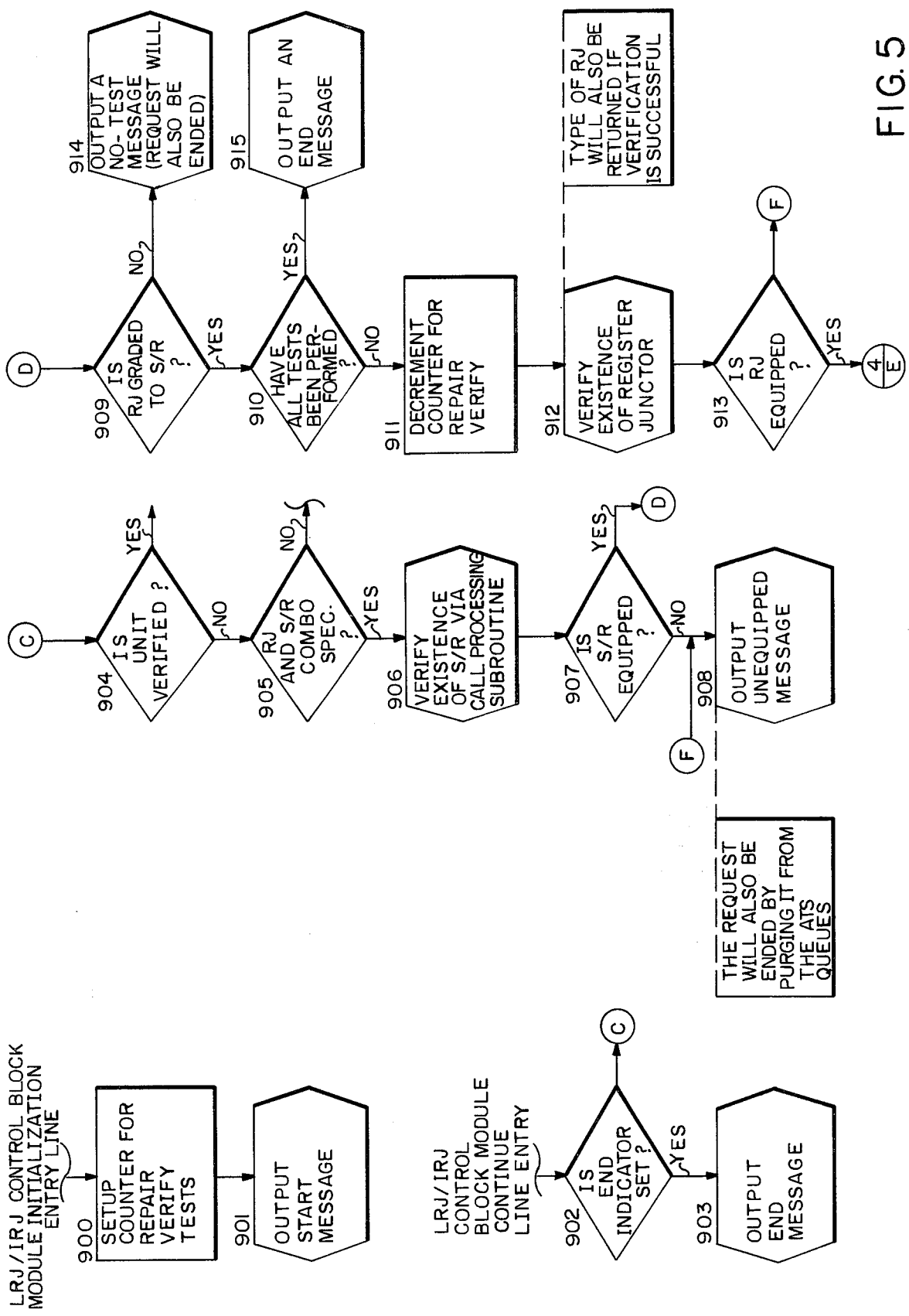

As shown in FIG. 5, the register junctor routining control block module initializes a counter for repair verify testing when entered at its initialization entry line and passes control to a subroutine to output a message indicating testing has started, as illustrated in blocks 900 and 901. Repair verify testing indicates that all possible functional tests are to be performed on the register junctor. The register junctor routining control block module receives control back at its continue entry line after the actions necessary to cause the output of the start message have been completed (block 902). The first test determines if the request has been completed. This test is performed by testing an end indicator 903 which if set, causes a link to a message subroutine to output another message on the teletypewriter indicating the end of the routining request has been reached and finally purges the request from the appropriate system ATS queue. Since in the present example the request has not been completed, a test is made to verify that the specified local register junctor has been previously verified to exist in the office (block 904). In the present example, this indicator is not set because this is the first path through the module for this request. Next, a test is performed to check if a register junctor and sender/receiver combination was specified as shown in block 905. Since in the present example, this is the case, the existence of the specified TCMF receiver is verified with an unequipped message output if the receiver is not equipped (blocks 906–908).

A final apparatus verification test is made to verify that specified local register junctor and TCMF receiver are graded such that they can work together. Failure of this test results in a message indicating the test cannot be performed and the request is ended as indicated in blocks 909–914.

Next, the repair verify counter is decremented to determine if all of the tests have been performed and if all tests are complete, the request is ended with a message indicating the end of the test as previously described (blocks 910–915). The repair verify is then decremented in the present example and a subroutine is called to verify that the specified local register is equipped as indicated in blocks 911–912. The request is ended as previously described if the specified register junctor is not equipped.

After the register junctor is verified equipped, the verification indicator is set and the data to be passed to the routining module is set up in the work area of memory storage as shown in blocks 916 and 917. Next, the routining inhibit hardware manual switch (not shown) is read (918) to verify that register junctor and receiver routining is presently allowed. The final test is then made to verify that the register junctor type and receiver or sender type are a compatible combination. In the present example, the local register junctor and TCMF receiver are compatible (blocks 920 and 921). Indicators are then initialized and the local register junctor routining module is scheduled via the system executive program as indicated in blocks 922–924.

Figure 6:
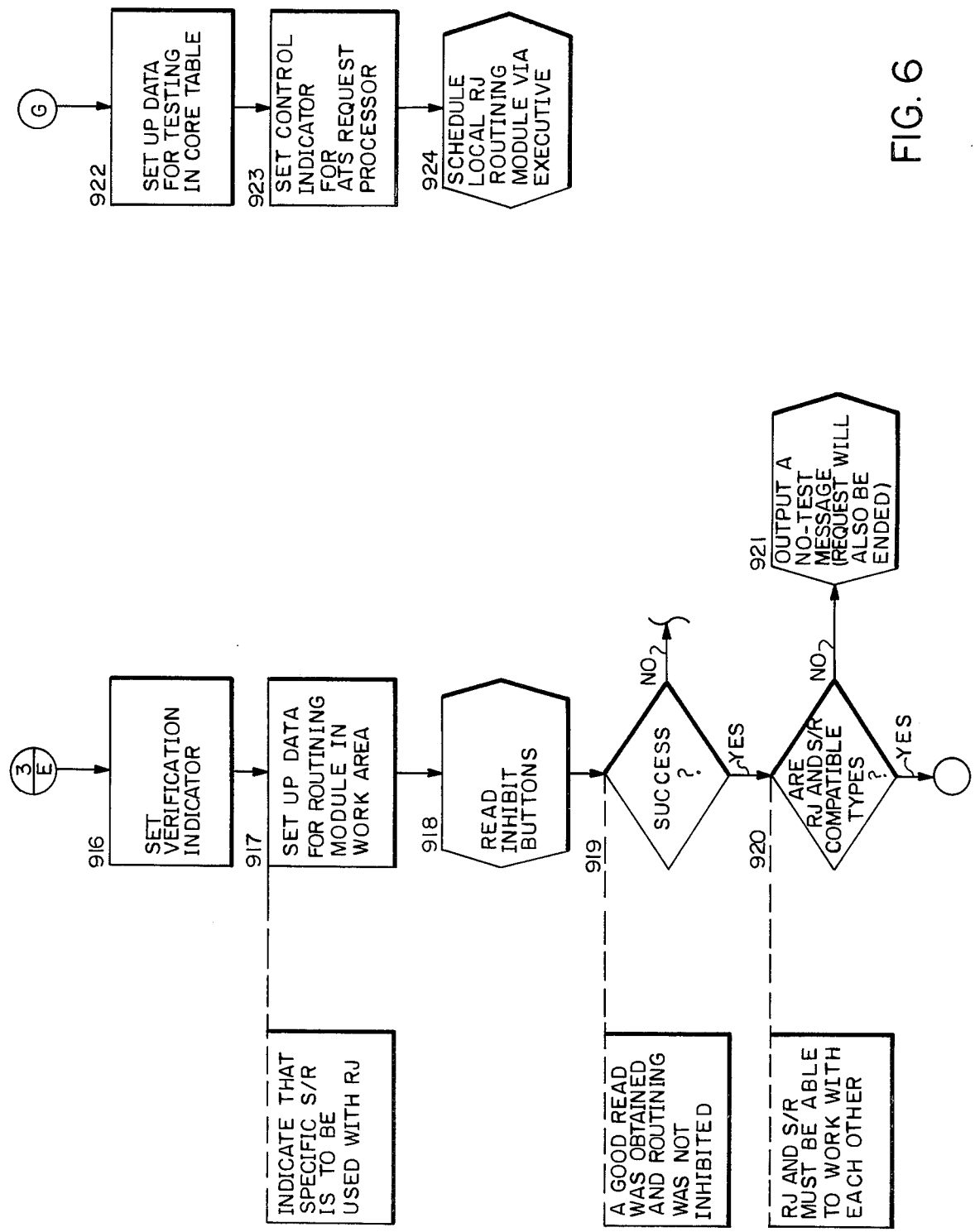
Figure 7:
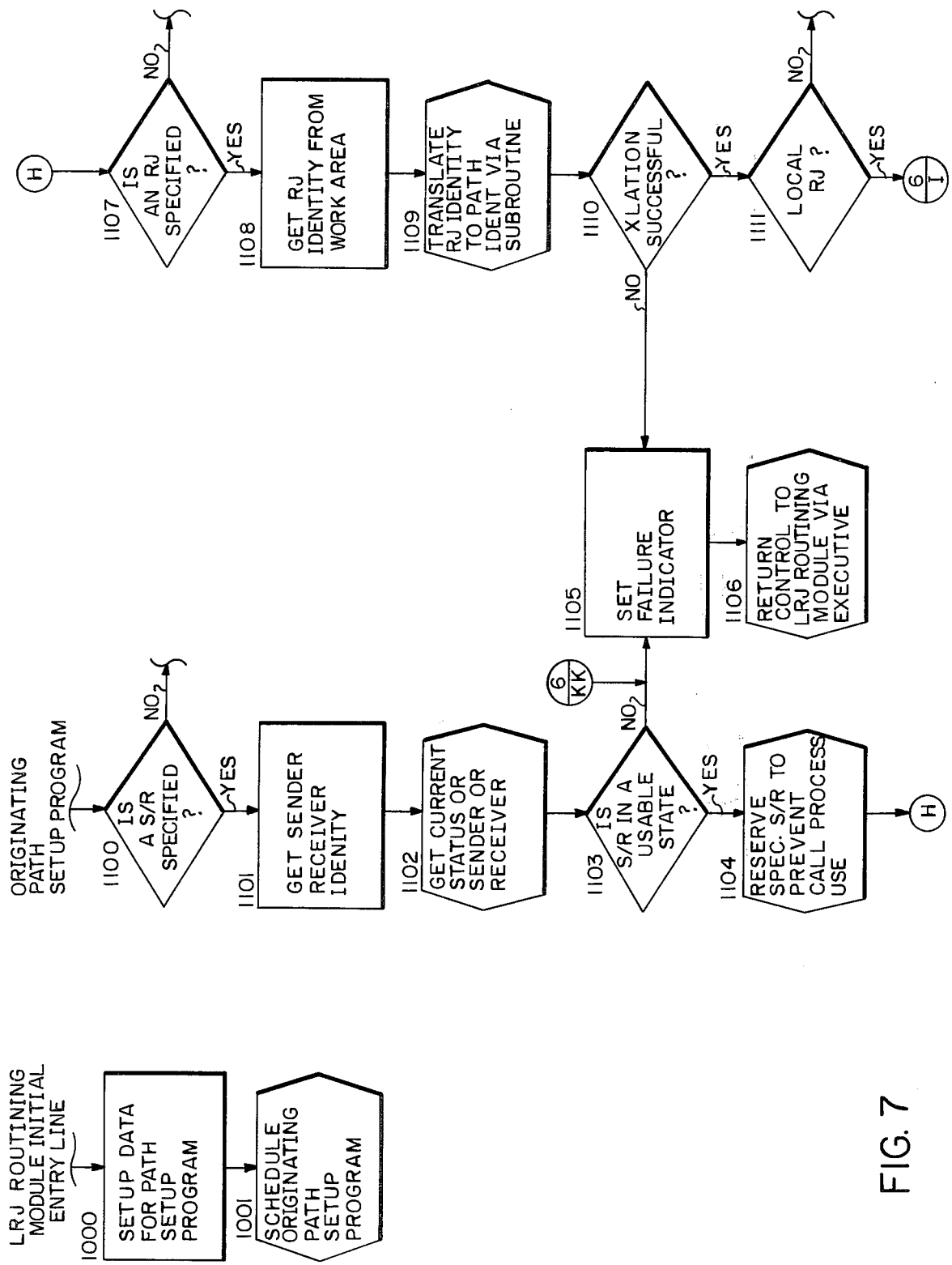
Figure 8:
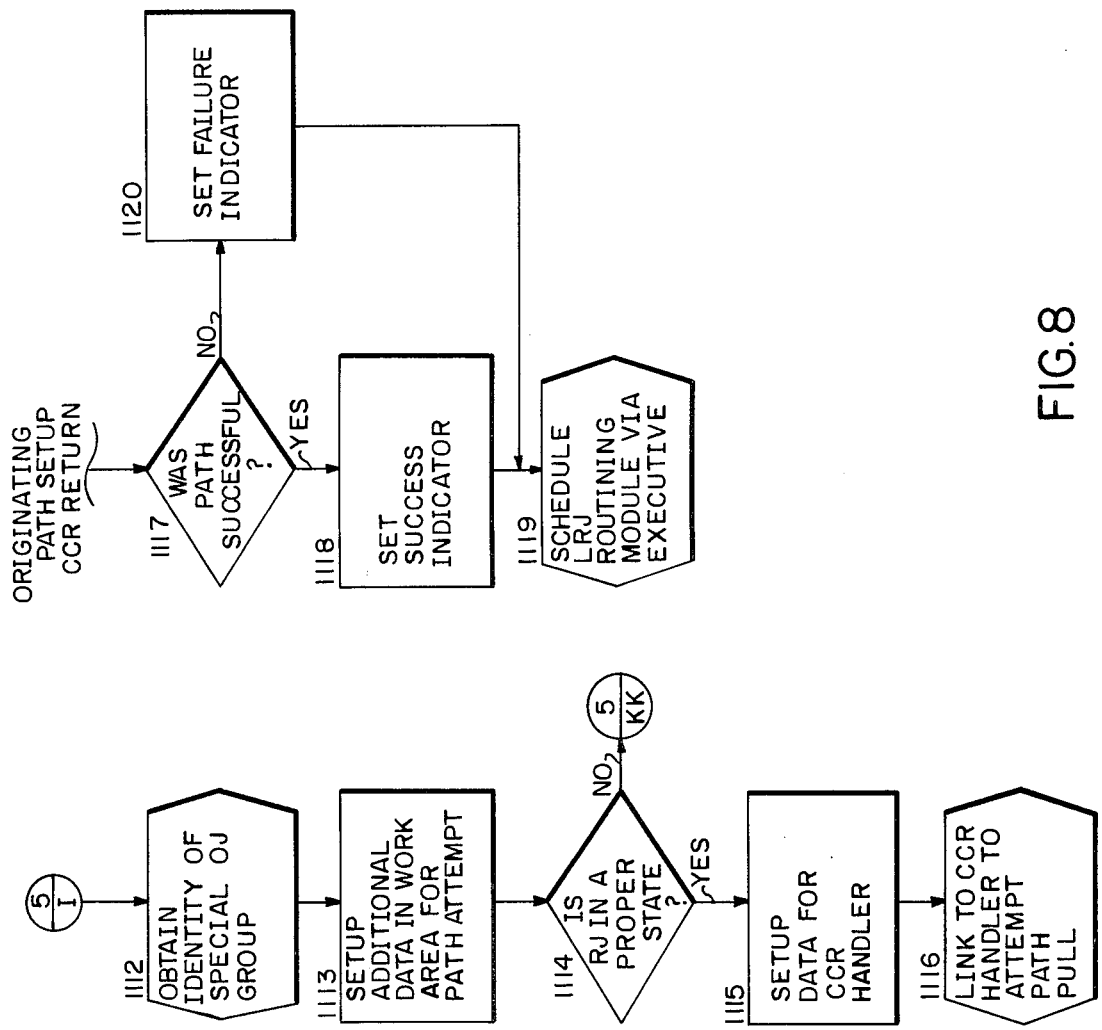

Referring now to FIG. 6, the local register junctor routining module begins by instructing the originating marker to set up a path from the inlet LTI to the specified local register junctor as shown in FIG. 1. The local register junctor routining module interfaces with the marker by preparing appropriate data and storing the data in the work area and then scheduling the originating path setup module, blocks 1000–1001. As shown in FIG. 7, the originating path setup module obtains the status of the TCMF receiver after determining that a combination local regiater junctor and TCMF receiver were specified (blocks 1100–1102). If the TCMF receiver is out of service or is busy in another use, control is returned to the local register junctor routining module with appropriate indicators set, blocks 1103–1106. If the receiver is available as in the present example, it is then reserved via software 1104. The specified local register junctor is then translated to yield a possible hardware path to the inlet LTI and the data is placed in the work area as indicated by blocks 1109–1113. Next, the specified register junctor is verified that it is neither busy nor out of service (1114). All data is then passed in the work area to the computer communication register handler module which performs the actual interface with the originating marker as indicated by blocks 1115 and 1116. The originating path setup module is returned control after the handler module completes its interface and evaluates the results of the path attempt by interrogating a success or failure indicator (blocks 1117–1120). The originating path setup module returns control to the routining module and the routining module after receiving control determines that the path was successful in the present example.

Next, the routining module places the logic circuit MRL into its start sequence 1201 to prepare it for testing the local register junctor. In the present example, the specified TCMF receiver is connected to the specified local register junctor to verify the ability of the junctor to access the matrix SRM. Hardware actions are then as described in the foregoing detailed description of FIG. 1. A failure to attach the receiver results in a trouble report output message and the request is terminated. The routining module next instructs the unit RSU to apply dial tone 1206. Successful dial tone detection by the system ATS causes the logic circuit MRL to advance sequence state and output a tone digit to TCMF receiver. The tone digit is received by the unit RSU and stored in memory RSM. The unit RSU then generates an interrupt to the computer. The logic circuit MRL, upon completion of sending and the detection of no dial tone which is removed automatically by the unit RSU, also generates an interrupt. When both interrupts have been received, the routining module checks the memory RSU to determine that the proper digit was received (blocks 1203 and 1208). The unit RSU is then instructed to drop the receiver (1211)

and continues the completion of the local register junctor routine test 1213 which includes setting up a second network path from the originating junctor to the outlet STO as previously described. This path verifies dial pulse sending capability of the register junctor.

Figure 9:
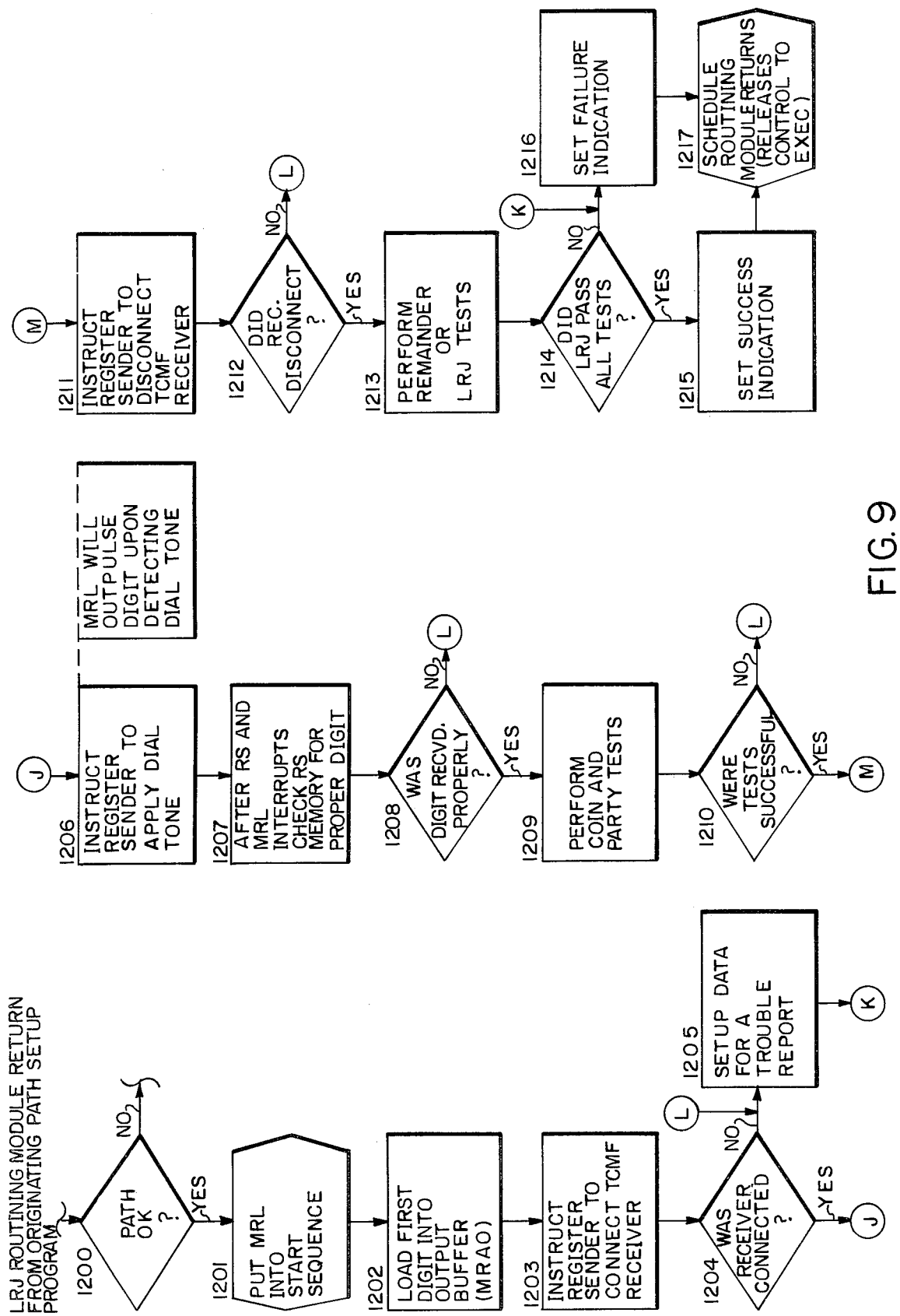
Figure 10:
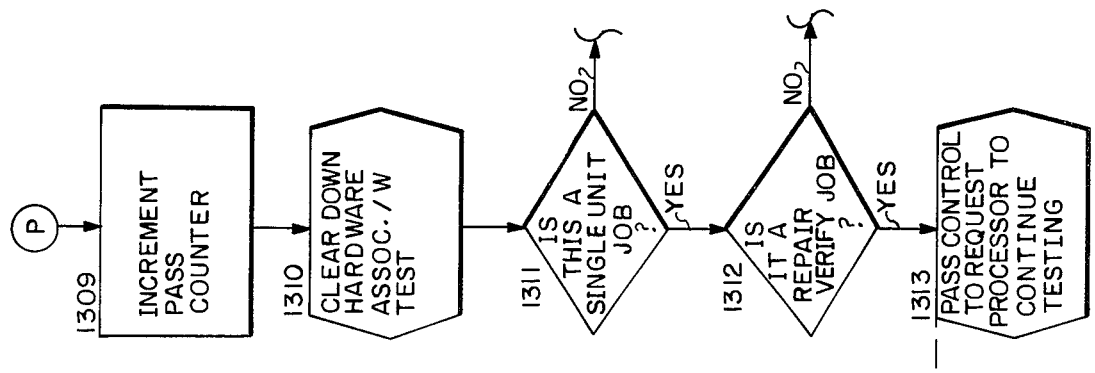
Figure 10:
Figure 10:
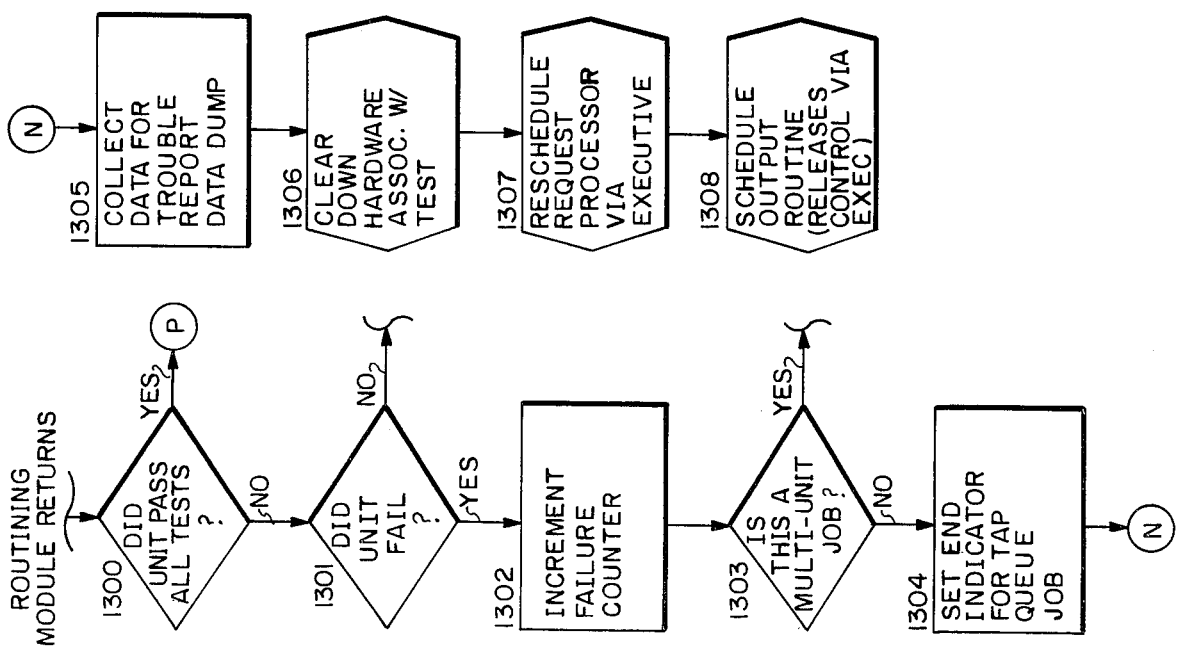

At the completion of these tests and assuming all tests passed, an all tests passed indicator is set, blocks 1214 and 1215, and the routining module returns module FIG. 9, is then scheduled as indicated in block 1217. The routining module returns module then increments the pass counter for the queue TAP, block 1309, and clears down the hardware used in the test 1310. Finally, if it is determined that the test is a repair verify test, the request processor is given control to continue testing and the cycle as previously described begins again until all tests for the register junctor have been completed (blocks 1311–1313). In the present example, when a register junctor and sender or receiver combination is specified, repair verify testing is always performed as a convenience for the switching system office craftsman.

If the combination of the local register junctor and TCMF receiver failed any of the tests, the fail counter for the queue TAP is incremented, and the routining request is ended as indicated by blocks 1301–1304. Finally, data is collected for the trouble report output message and the hardware as used in the test is cleared and returned to the idle state, blocks 1305 and 1306. A request is then made to schedule the request processor module with the failing data where control is released to the system executive program to output a trouble report as shown in blocks 1307 and 1308.

The hardware circuits as shown in FIG. 1 together with the accompanying software for controlling the circuits the operation of the sender receiver matrix SRM to be verified by providing the capability to test selectively register junctor or receiver pairs.

While the foregoing described software program is the preferred manner of controlling the method and apparatus of the present invention, it is to be understood that other programs may also be employed and that suitable hardware circuits or manually controlled switches may be employed to control the method and apparatus of the present invention as will be apparent to those skilled in the art.

What is claimed is:

1. In a communication switching system having a line switching network for establishing connections selectively between calling and called lines under the control of common equipment including a plurality of registers for storing temporarily call processing information received from the calling lines via a plurality of register junctors, a junctor switching network connecting selectively a pool of units comprising sending units and receiving units to the junctors; the common equipment including memory means, a method for isolating malfunctions, comprising:
establishing a test connection through the junctor switching network between one of said register junctors and one of said units for testing purposes;
providing testing means;
connecting said testing means to the register junctor under test via the line switching network;
testing the register junctor under test to determine whether it can operate properly;
testing said unit under test with said testing means via said test connection if the junctor was determined to operate properly;
establishing subsequently another test connection between a different one of the register junctors and said same unit under test if said unit was determined to operate improperly;
testing said unit under test again after establishing said another test connection;
determining that said unit under test is faulty if said unit functions improperly for the second test; and
determining that said junctor network is faulty if said unit under test functions properly for the second test.

2. A method according to claim 1, wherein said testing of the junctor under test includes determining if it can extend a connection from the line switching network to the junctor switching network.

3. A method according to claim 2, wherein said junctor switching network comprises a crosspoint switching network.

4. In a communication switching system having a line switching network for establishing connections selectively between calling and called lines under the control of common equipment including a plurality of registers for storing temporarily call processing information received from the calling lines via a plurality of register junctors, a junctor switching network connecting selectively a pool of units comprising sending units and receiving units to the junctors, the common equipment including memory means, an apparatus for isolating malfunctions comprising:
means for establishing a test connection through the junctor switching network between one of said register junctors and one of said units for testing purposes;
testing means;
means for connecting said testing means to the register junctor under test via the line switching network;
means for testing the register junctor under test to determine whether it can operate properly;
means for testing said unit under test with said testing means via said test connection if the junctor was determined to operate properly;
means for establishing subsequently another test connection between a different one of the register junctors and said same unit under test if said unit was determined to operate improperly;
means for testing said unit under test again after establishing said another test connection;
means for determining that said unit under test is faulty if said unit functions improperly for the second test; and
means for determining that said junctor network is faulty if said unit under test functions properly for the second test.

5. An apparatus according to claim 4, wherein said testing of the junctor under test includes determining if it can extend a connection from the line switching network to the junctor switching network.

6. An apparatus according to claim 5, wherein said junctor switching network comprises a crosspoint switching network.

* * * * *